United States Patent
Fletcher et al.

(10) Patent No.: US 8,261,293 B2
(45) Date of Patent: Sep. 4, 2012

(54) METHODS, SYSTEMS AND COMPUTER PROGRAM PRODUCTS FOR APPLICATION NAME AND CLIENT ID PAIRING IN A MESSAGE CONNECTION

(75) Inventors: Benjamin J. Fletcher, Winchester (GB); Martin J. Gale, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 12/176,689

(22) Filed: Jul. 21, 2008

(65) Prior Publication Data

US 2010/0017808 A1    Jan. 21, 2010

(51) Int. Cl.
*G06F 3/00* (2006.01)
(52) U.S. Cl. .................................. 719/328; 719/330
(58) Field of Classification Search .................. 719/313, 719/321, 328, 330
See application file for complete search history.

(56) References Cited

U.S. PATENT DOCUMENTS

| | | | | |
|---|---|---|---|---|
| 6,345,315 | B1 * | 2/2002 | Mishra | 719/329 |
| 6,526,433 | B1 * | 2/2003 | Chang et al. | 709/201 |
| 2005/0027584 | A1 | 2/2005 | Fusari | |
| 2007/0055743 | A1 * | 3/2007 | Pirtle et al. | 709/217 |
| 2008/0127156 | A1 * | 5/2008 | Buza et al. | 717/166 |
| 2008/0127209 | A1 * | 5/2008 | Gale et al. | 719/313 |
| 2010/0125651 | A1 * | 5/2010 | Zapata et al. | 709/220 |

OTHER PUBLICATIONS

Svend Frolund, Quality-of-service specifiation in distributed object systems, Jul. 1, 1998.*

* cited by examiner

*Primary Examiner* — Lechi Truong
(74) *Attorney, Agent, or Firm* — Cantor Colburn LLP; Jeanine Ray

(57) ABSTRACT

An exemplary embodiment includes a method for pairing an application name and a client ID in a messaging broker infrastructure, the method including running a messaging system associated with the messaging broker infrastructure running a monitoring application configured to monitor a connection to the messaging broker, creating a connection to the messaging broker, identifying a class name and the client ID associated with an application, converting the class name to an application name and publishing a pairing of the application name and the client ID on the messaging infrastructure.

18 Claims, 3 Drawing Sheets

US 8,261,293 B2

METHODS, SYSTEMS AND COMPUTER PROGRAM PRODUCTS FOR APPLICATION NAME AND CLIENT ID PAIRING IN A MESSAGE CONNECTION

TRADEMARKS

IBM® is a registered trademark of International Business Machines Corporation, Armonk, N.Y., U.S.A. Other names used herein may be registered trademarks, trademarks or product names of International Business Machines Corporation or other companies. Java and all Java-based trademarks and logos are trademarks of Sun Microsystems, Inc. in the United States, other countries, or both. Linux is a registered trademark of Linus Torvalds in the United States, other countries, or both.

BACKGROUND

This invention relates generally to messaging, and more particularly to methods, systems and computer program products for application name and client ID pairing in a message connection.

Currently, a message broker may be used by multiple applications on the same box (e.g., a computer). The broker simply sees a set of connections all from the same IP address. When a problem occurs with one of the connections, the broker may not be able to determine which application is affected.

BRIEF SUMMARY

An exemplary embodiment includes a method for pairing an application name and a client ID in a messaging broker infrastructure, the method including running a messaging system associated with the messaging broker infrastructure running a monitoring application configured to monitor a connection to the messaging broker, creating a connection to the messaging broker, identifying a class name and the client ID associated with an application making a call over the connection, converting the class name to an application name and publishing a pairing of the application name and the client ID on the messaging infrastructure.

Another exemplary embodiment includes a computer program product for pairing an application name and a client ID in a messaging broker infrastructure, the computer program product including instructions for causing a computer to implement a method, the method including running a messaging system associated with the messaging broker infrastructure, running a monitoring application configured to monitor a connection to the messaging broker, creating a connection to the messaging broker, identifying a class name and the client ID associated with an application making a call over the connection, converting the class name to an application name and publishing a pairing of the application name and the client ID on the messaging infrastructure.

An additional exemplary embodiment includes a system for pairing an application name and a client ID in a messaging broker infrastructure, the system including a processor, an application for causing the processor to run a messaging system associated with the messaging broker infrastructure, run a monitoring application configured to monitor a connection to the messaging broker, create a connection to the messaging broker, identify a class name and the client ID associated with an application making a call over the connection, convert the class name to an application name and publish a pairing of the application name and the client ID on the messaging infrastructure.

BRIEF DESCRIPTION OF THE SEVERAL VIEWS OF THE DRAWINGS

Referring now to the drawings wherein like elements are numbered alike in the several FIGURES.

DETAILED DESCRIPTION OF EXEMPLARY EMBODIMENTS

In exemplary embodiments, the methods, systems and computer program products described herein implement an application class name (or similar) to link a given connection with a given application. The methods, systems and computer program products described herein first set up a communication connection when an application communicates with a message broker. When the connection is set up, a client ID is assigned to the connection. When the application makes a first call over the connection, a correlation is made between the connection in use (i.e., the client ID) and the application making the call (i.e., the application class or name making the call). If a subsequent problem with the connection occurs, the application likely to be affected is known. A particular runtime may have multiple applications running on top of the runtime and the connection ID may in the first instance have been associated with the runtime rather than the individual application. In exemplary embodiments, the methods, systems and computer program products described herein allow the system to know which application running on the runtime is actually using the connection.

Figure 1:
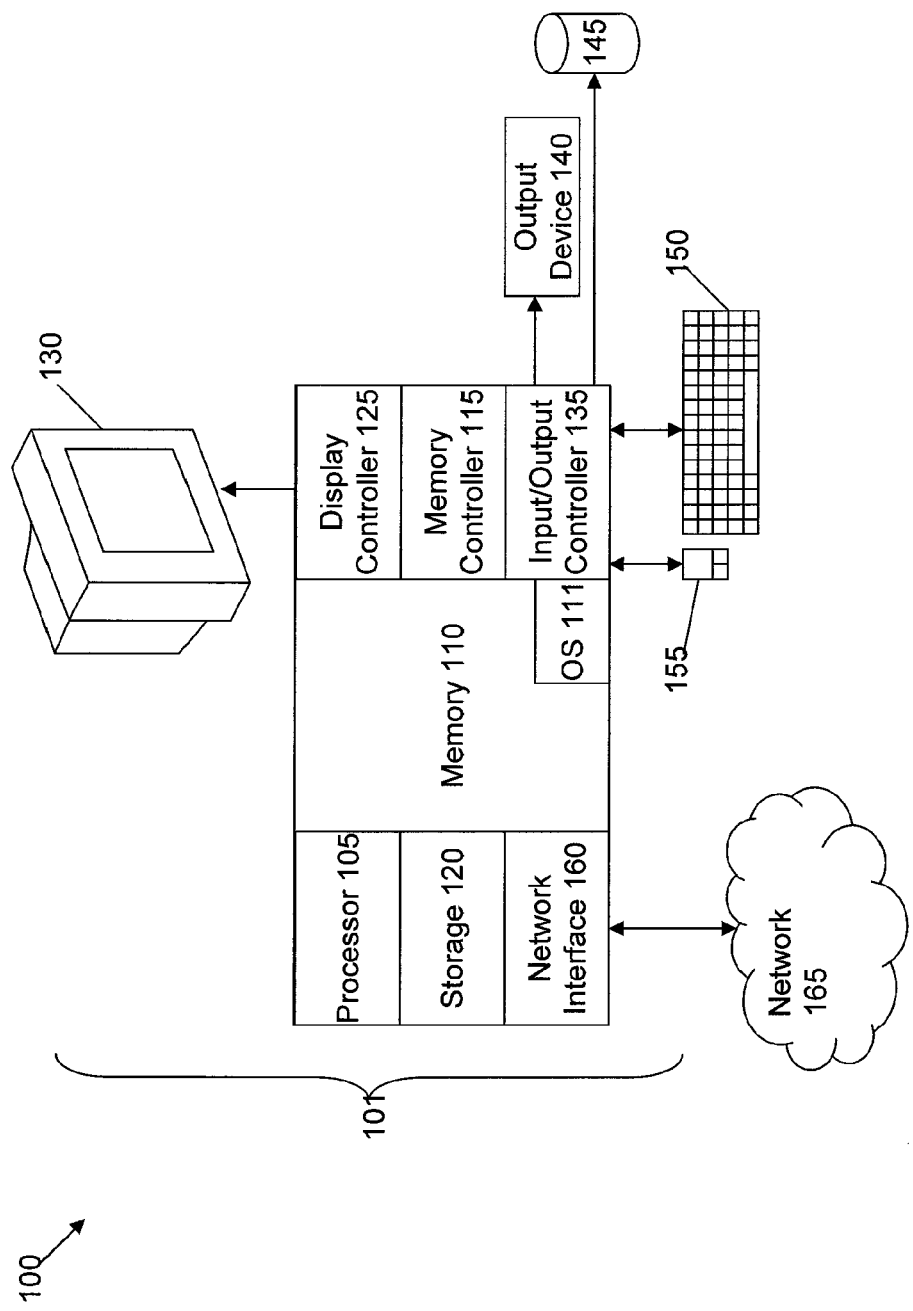
FIG. 1 illustrates an exemplary embodiment of a system for application name and client ID pairing in a message connection in accordance with exemplary embodiments.

FIG. 1 illustrates an exemplary embodiment of a system 100 for application name and client ID pairing in a message connection in accordance with exemplary embodiments. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the application name and client ID pairing methods described herein in accordance with exemplary embodiments and a suitable operating system (OS) 111. The operating system 111 essentially controls the execution of other computer programs, such the application name and client ID pairing systems and methods described herein, and provides scheduling, input-output control, file and data management, memory management, and communication control and related services.

The application name and client ID pairing methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the application name and client ID pairing methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The application name and client ID pairing methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The application name and client ID pairing methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the application name and client ID pairing methods are implemented in hardware, the application name and client ID pairing methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
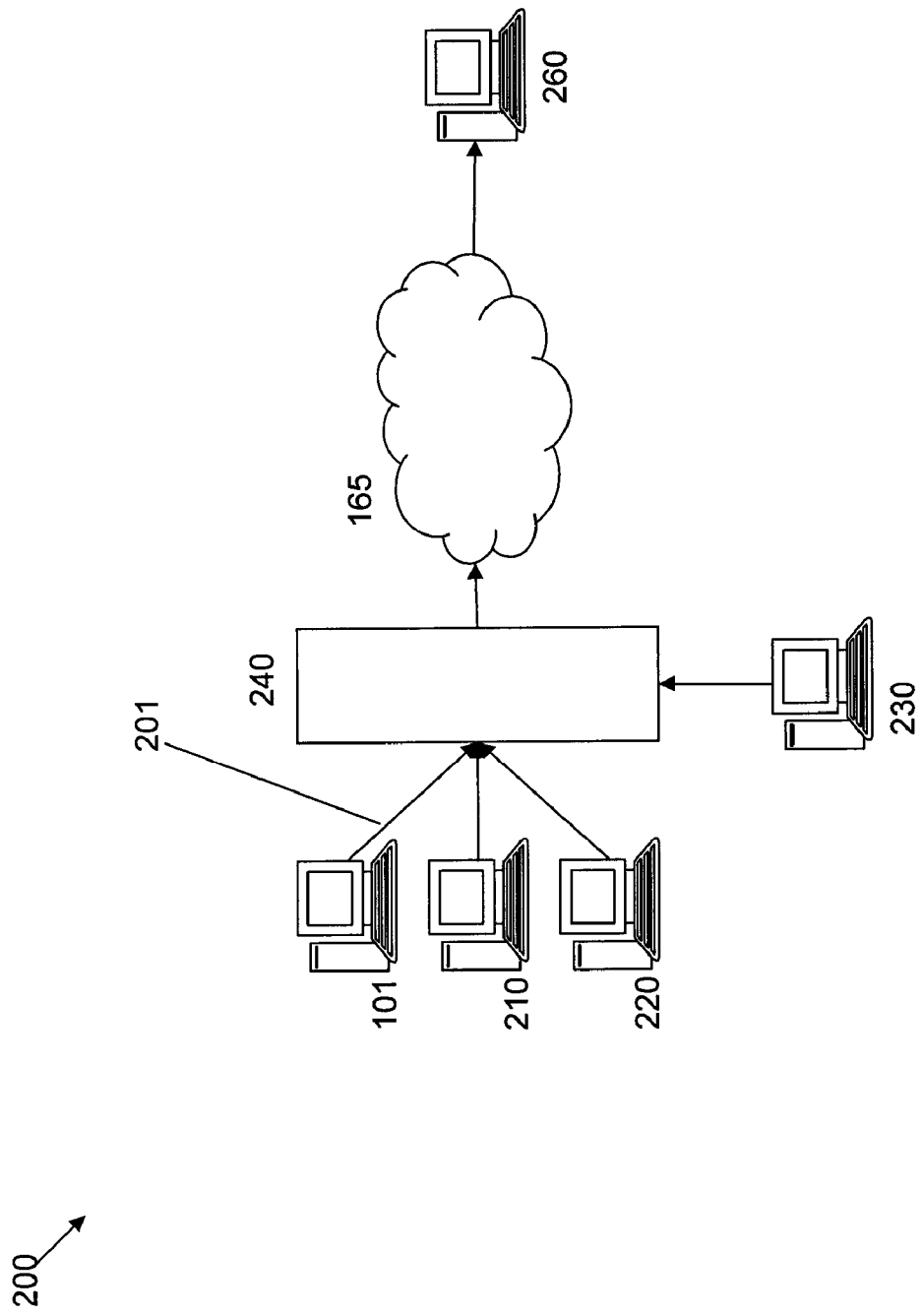
FIG. 2 illustrates an exemplary embodiment of a system for application name and client ID pairing in a message connection in accordance with exemplary embodiments.

FIG. 2 illustrates an exemplary embodiment of a system 200 for application name and client ID pairing in a message connection in accordance with exemplary embodiments. The computer 101 as described with respect to the system 100 of FIG. 1 may be one client of multiple clients 210, 220, 230 coupled to a message broker 240, which can be positioned between the multiple client computers 101, 210, 220, 230 and the network 165, which is coupled to an additional computer 260. As described herein, one or more of the computers such as the computer 101 may include multiple applications that are establishing a connection 201 with the broker 240 for communication with one or more of the other computers such as computers 210, 220, 230, 260. In addition as described above, a particular runtime on the computer 101 having the multiple applications running on top of the runtime and the connection ID may, in the first instance of an application communicating with the broker 240, have been associated with the runtime rather than the individual application contacting the broker 240. In exemplary embodiments, the systems and methods described herein allow the system 200 to know which application running on the runtime is actually using the connection 201.

In one example, connections having a client ID can be in the form:
  Connection createConnection(String userName, String password)

In this form, it may be difficult to correlate connections to applications because only the client id of each connection as well as, through the TCP/IP layer, the IP address is provided. The exemplary embodiments described herein determine which application establishes the connection.

In exemplary embodiments, the application's class name is obtained from the calling thread for connection creation, and this class name is paired with the client ID. For example, a class name "apps/com.comp.office.Application" is paired to the client ID "BBCTicker". In exemplary embodiments, an additional step can include converting step the class name to an application name.

Figure 3:
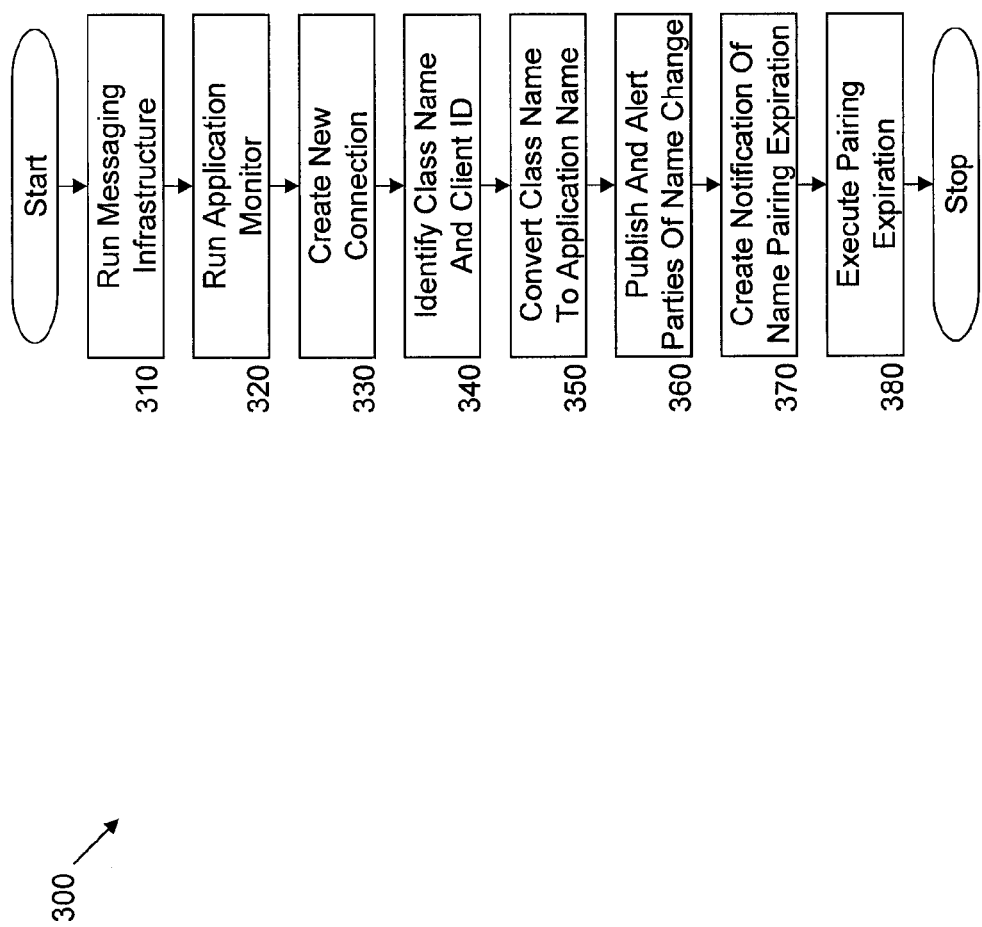
FIG. 3 illustrates a flow chart of a method for application name and client ID pairing in a message connection in accordance with exemplary embodiments.

FIG. 3 illustrates a flow chart of a method 300 for application name and client ID pairing in a message connection in accordance with exemplary embodiments. At block 310, the existing messaging infrastructure can be run on the computer 101. At block 320, a monitoring application (e.g., a JVM monitor (as part of infrastructure or as a separate 3rd party component which can monitor the JVM) or a dynamic link library) to monitor the applications that call networking methods is run on the computer 101. At block 330, the application running on the computer creates a new connection 201 via the monitoring application. At block 340, the monitoring application recognizes that the connection 201 has been established and identifies the class name and client ID for the application. At block 350, the class name is converted to an application name (there are various ways of performing this conversion, e.g., last package name, the whole package name, etc.). At block 360, the monitoring application publishes this conversion and alerts interested parties, internal or external to infrastructure (e.g., the system 200), of the pairing, such as the "This application xyz has connected to the broker 240 using client ID." At block 370, either or both the monitoring application and the broker 240 are notified of the expiration of the pairing of the application name and the client ID (e.g., JVM dying and message's Last Will and Testament are activated). At block 380, when the connection 201 or the application die, gracefully or suddenly/unexpectedly, the above the actions associated with the expiration (e.g., JVM dying and message's Last Will and Testament are activated) are executed simultaneously.

The methods, systems and computer program products described herein can run a JVM monitor when the connecting application is a Java™ application. In exemplary embodiments, a given application can resolve connections back to the class name of the connecting application, such as programs that are of native code. Currently, many applications implemented by firewalls replace networking libraries (e.g., dynamic linking libraries). In exemplary embodiments, the application implements the networking libraries to monitor the applications that call networking methods. In another example, Linux® is open and includes APIs for callbacks on any system calls including networking calls. In exemplary embodiments, the systems and methods described herein access an operating system's networking layer to perform monitoring, establishing connections and pairing application name and Client IDs as described herein.

In an example, messaging between two applications developed using heterogeneous technologies that are using a small footprint broker for inter-process communications are studied. A first application, by default has a broker running, and may be used to communicate with documents of a second application (so, for example, a document can show the online status of an email address in it—in green if online, black otherwise). This example illustrates how multiple applications are using the broker on the same box. Any one application may have multiple connections to the broker and, when there are multiple applications, there are multiple connections from the same IP address, and the ability to correlate the connections to applications in a real time manner (live, the information becomes unavailable when no longer correct—a sudden death to the JVM, transport channel, etc.) would make administration and problem determination for this particular scenario easier In the example, the broker is run by default with the first application, the pairing is published with no length restriction by a plugin of the first application which monitors the JVM for when a connection creation is made (monitoring/profiling API's for JVM). This information is correct until the JVM monitor is told that the application has died, or the broker performs the Last Will and Testament, after which this pairing is no longer present.

Technical effects and benefits include retaining existing protocols and existing API and retaining an application name in any existing field (like the client ID field).

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for pairing an application name and a client ID in a messaging broker infrastructure, the method comprising:
running a messaging system associated with the messaging broker infrastructure;
running a monitoring application configured to monitor a connection to the messaging broker;
creating a connection to the messaging broker;
identifying a class name and the client ID associated with an application making a call over the connection, the application on top of a runtime;
in response to the application making the call over the connection, correlating the connection and the application;
determining if the connection is associated with the application or with the runtime;
in response to a problem with the connection, identifying the application as affected by the problem regardless of whether the connection is associated with the application or the runtime;
converting the class name to an application name; and
publishing a pairing of the application name and the client ID on the messaging infrastructure;
sending a notification that the pairing of the application name and the client ID has an expiration.

2. The method as claimed in claim 1 wherein the monitoring application is a JVM monitor.

3. The method as claimed in claim 1 further comprising sending an alert that of the pairing of the application name and the client ID on the messaging infrastructure.

4. The method as claimed in claim 1 further comprising monitoring at least one of the connection to the messaging broker and the application for at least one of a graceful and unexpected closure.

5. The method as claimed in claim 1 wherein the monitoring application monitors the application via networking libraries.

6. The method as claimed in claim 1 wherein the monitoring application monitors the application by opening and including application programming interfaces on system calls.

7. The method as claimed in claim 6 wherein the system calls are networking calls.

8. The method as claimed in claim 1 wherein the monitoring application monitors the application and establishes the connection by accessing a network layer of the messaging broker infrastructure.

9. The method as claimed in claim 8 wherein the monitoring application pairs the application name and the client ID by accessing the network layer of the messaging broker infrastructure.

10. A computer program product for pairing an application name and a client ID in a messaging broker infrastructure, the computer program product having a non-transitory computer readable medium including instructions for causing a computer to implement a method, the method comprising:
running a messaging system associated with the messaging broker infrastructure;
running a monitoring application configured to monitor a connection to the messaging broker;
creating a connection to the messaging broker;
identifying a class name and the client ID associated with an application making a call over the connection, the application on top of a runtime;
in response to the application making the call over the connection, correlating the connection and the application;
determining if the connection is associated with the application or with the runtime;
in response to a problem with the connection, identifying the application as affected by the problem regardless of whether the connection is associated with the application or the runtime;
converting the class name to an application name; and
publishing a pairing of the application name and the client ID on the messaging infrastructure;
sending a notification that the pairing of the application name and the client ID has an expiration.

11. The computer program product as claimed in claim 10 wherein the monitoring application is a JVM monitor.

12. The computer program product as claimed in claim 10 wherein the method further comprises sending an alert that of the pairing of the application name and the client ID on the messaging infrastructure.

13. The computer program product as claimed in claim 10 wherein the method further comprises monitoring at least one of the connection to the messaging broker and the application for at least one of a graceful and unexpected closure.

14. The computer program product as claimed in claim 10 wherein the monitoring application monitors the application via networking libraries.

15. The computer program product as claimed in claim 10 wherein the monitoring application monitors the application by opening and including application programming interfaces on system calls.

16. The computer program product as claimed in claim 15 wherein the system calls are networking calls.

17. The computer program product as claimed in claim 10 wherein the monitoring application monitors the application and establishes the connection by accessing a network layer of the messaging broker infrastructure.

18. A system for pairing an application name and a client ID in a messaging broker infrastructure, the system comprising:
a processor;
an application for causing the processor to:
run a messaging system associated with the messaging broker infrastructure;
run a monitoring application configured to monitor a connection to the messaging broker;
create a connection to the messaging broker;
identify a class name and the client ID associated with an application making a call over the connection, the application on top of a runtime;

in response to the application making the call over the connection, correlating the connection and the application;

determining if the connection is associated with the application or with the runtime;

in response to a problem with the connection, identifying the application as affected by the problem regardless of whether the connection is associated with the application or the runtime;

convert the class name to an application name; and publish a pairing of the application name and the client ID on the messaging infrastructure;

sending a notification that the pairing of the application name and the client ID has an expiration.

\* \* \* \* \*